Jan. 21, 1964  J. W. WRIGHT  3,118,471
CONTROL VALVE

Filed Sept. 26, 1958  2 Sheets-Sheet 1

Jan. 21, 1964     J. W. WRIGHT     3,118,471

CONTROL VALVE

Filed Sept. 26, 1958     2 Sheets-Sheet 2

United States Patent Office 3,118,471
Patented Jan. 21, 1964

3,118,471
CONTROL VALVE
John W. Wright, Long Beach, Calif., assignor to Robertshaw Controls Company, a corporation of Delaware
Filed Sept. 26, 1958, Ser. No. 763,716
15 Claims. (Cl. 137—630.19)

This invention relates generally to thermostatic control valves and more particularly to combined snap-acting and throttling valves for regulating fluid flow to gas-fired heaters and the like in response to temperature changes in a space to be heated.

In the use of space heaters, it is desirable that the stratification of the air in the space to be heated be held to a minimum. This can be accomplished by throttling down the flow of fuel to a heater so as to slow down the room temperature rise and prolong the "burner on" time thereby effecting a longer period of thermal convection.

It is well known to employ overcenter snap-acting mechanisms for controlling the movement of valve members. These overcenter snap-acting mechanisms have considerable preliminary graduating movement as the snap-acting means moves from one or the other of its snapped positions to the dead center position. In conventional snap-acting valves, this preliminary graduating movement has not been utilized to any considerable degree.

It is an object of this invention to utilize the preliminary graduating movement of a snap-acting means for effecting a throttling action of a control valve of the indicated type.

Another object of this invention is to regulate the flow of fuel to a space heater or the like so as to minimize the stratification of the air in the space to be heated.

Another object of this invention is to combine a snap-acting valve and a throttling valve in a unitary casing so that after the snap-acting valve has snapped to the open position, the throttling valve will modulate the valve outlet flow.

In the preferred embodiment of the invention, a thermostat responsive to the temperature of the space to be controlled controls the movement of a snap-acting valve cooperable with a main valve seat. This snap-acting valve includes an overcenter clicker disc. By means of a lever connection, the thermostat also controls the movement of a throttling valve which cooperates with a secondary valve seat. During temperature variations in the space to be controlled which are insufficient to cause the snap-acting valve to snap over, the thermostat will actuate the over-center disc within the preliminary graduating movement thereof and there will be no movement of the snap-acting valve. However, this movement of the thermostat will be transmitted to the throttling valve which will be moved into and out of engagement with the secondary seat to throttle the outlet flow to the space heater.

The above and other objects and features of the invention will appear more fully from a consideration of the following disclosure taken in connection with the accompanying drawings wherein.

Figure 1:
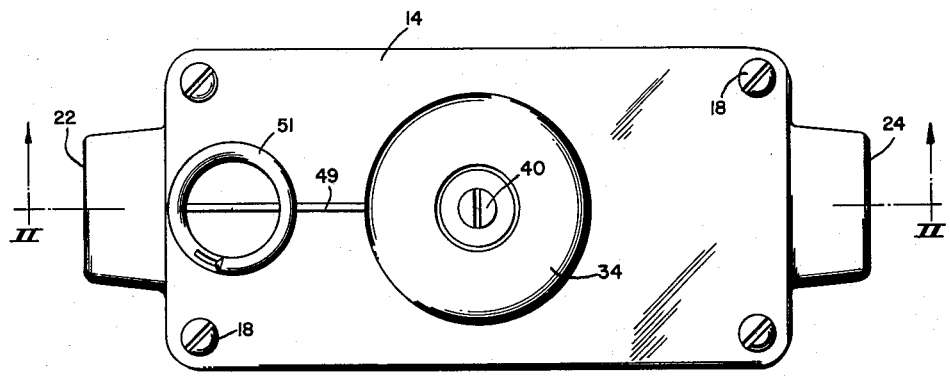
FIG. 1 is a plan view of a preferred embodiment of the invention.
Figure 2:
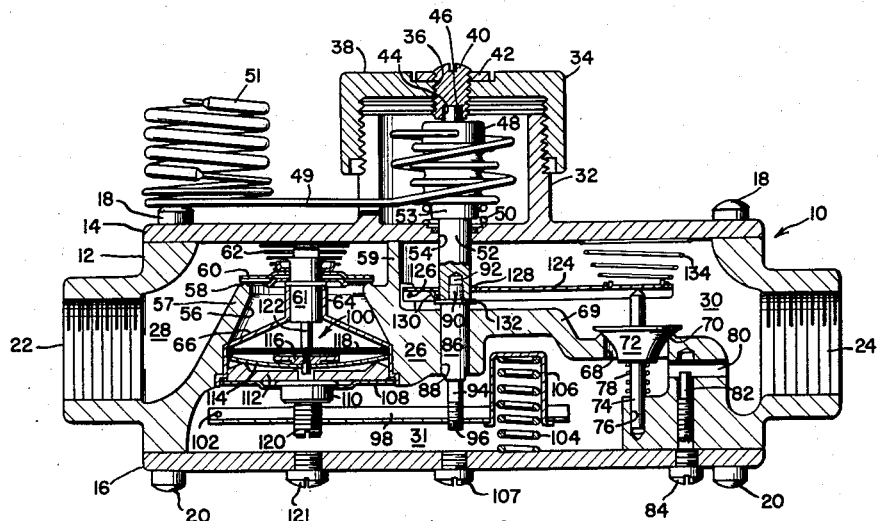
FIG. 2 is a sectional view taken on line II—II of FIG. 1.

Referring now to FIGS. 1 and 2, the combined snap-acting and throttling valve illustrated therein includes a casing 10 comprised of a valve body 12 having a substantially rectangular upper plate 14 and a substantially rectangular lower plate 16 secured thereto by suitable means, such as bolts 18 and 20, respectively. Valve body 12 defines an inlet 22 and an outlet 24 and has an integrally formed intermediate wall member 26 extending therebetween which cooperates with upper plate 14 and lower plate 16 to define an inlet chamber 28 communicating with inlet 22, an outlet chamber 30 communicating with outlet 24, and a central chamber 31 located between inlet chamber 28 and outlet chamber 30. Passageways 56 and 68, bored respectively in individual walls 57 and 69 of intermediate wall member 26, communicate chamber 31 with inlet chamber 28 and outlet chamber 30. In addition, a partition wall 59, formed integrally with intermediate wall member 26, cooperates with upper plate 14 to separate inlet chamber 28 from outlet chamber 30. A second passageway 80, located adjacent passageway 69, also communicates central chamber 31 with outlet chamber 30. Each of the passageways 56, 68, and 80 are more fully described hereinbelow.

Upper plate 14 has an externally threaded, upwardly extending cylindrical projection 32. An internally threaded, cup-shaped temperature adjusting dial 34 threadedly engages cylindrical projection 32 and has a threaded bore 36 extending through the base 38 thereof. A temperature adjusting plug 40 is threadedly mounted in bore 36 and has a lockwasher 42 threadedly secured thereto for locking plug 40 against rotation. Plug 40 has a recess 44 therein for reception of the top end 46 of an expansible and contractable bellows 48 biased into engagement with plug 40 by means of a spring 50 positioned in compression between bellows 48 and upper plate 14.

Bellows 48 contains a suitable thermally responsive fluid and communicates, through a capillary tube 49, with a temperature sensing bulb 51 which may be positioned in the space where the temperature is to be controlled. A stem 52, secured to the lower end 53 of bellows 48, extends downwardly through the center of spring 50 and through a bore 54 in upper plate 14 into outlet chamber 30. Bore 54 is in axial alignment with plug 40 and permits axial movement of stem 52 upon any axial movement of bellows 48.

Since the top end 46 of bellows 48 is confined against movement by plug 40, lower end 53 is movable in accordance with expansion and contraction of bellows 48 in response to temperature variations in the temperature sensed by bulb 51 to thereby cause axial movement of stem 52. It will be apparent that stem 52 is also axially movable upon rotation of either dial 34 or temperature adjusting plug 40 which rotation causes axial movement of bellows 48.

Passageway 56 in intermediate member 26 communicates inlet chamber 28 with central chamber 31 and has a valve seat 58 formed thereon to intersect passageway 56. An annular control valve member 60 secured to a valve stem 61 is mounted for movement into and out of engagement with valve seat 58 to control the flow of fluid through passageway 56 in a manner to be hereinafter described. Valve member 60 is biased toward valve seat 58 by a coil spring 62 mounted in compression between upper plate 14 and the inlet side of valve member 60. Valve stem 61 is axially slidable in a valve guide 64 formed on the base of a cup-shaped support member 66 secured to partition 26 in central chamber 31 by suitable means.

Circular passageway 68 in intermediate member 26 extends between central chamber 31 and outlet chamber 30 and has a valve seat formed thereon intersecting passageway 68. A tapered throttle valve member 72 secured to a valve stem 74 is mounted for movement into and out of engagement with valve seat 70 to regulate the flow of fuel to passageway 68 in a manner to be hereinafter described. Valve stem 74 is slidably mounted within a bore 76 formed in valve body 12 in axial alignment with the longitudinal axis of valve seat 70. Valve member 72 is biased away from valve seat 70 by a coil spring 78 mounted on valve stem 74 and in compression between the upstream side of valve member 72 and valve body 12.

Second passageway 80 in intermediate member 26 communicates central chamber 31 and outlet chamber 30 whereby a flow of fluid may pass from central chamber 31 to outlet chamber 30 even though valve member 72 has covered passageway 68. The flow area of passageway 80 is adjustable by means of an adjustable valve member 82 threadedly mounted in valve body 12 so as to project into passageway 80. An access plug 84 is threaded into lower plate 16 at a position whereby removal thereof permits access to adjustable valve member 82 from the exterior of casing 10.

A control means is provided for transmitting the movement of bellows 48 to control valve member 60 and throttle valve member 72. Such means takes the form of a control shaft 86 axially movable in response to movement of bellows 48 and operative connections between control shaft 86 and valve members 60 and 72. Control shaft 86 is positioned for slidable movement within a bore 88 formed in intermediate member 26 in axial alignment with bore 54 and has the upper end 90 thereof extending into a recess 92 formed in the end of stem 52. The lower end 94 of control shaft 86 extends into central chamber 31 to engage an adjustment screw 96 threadedly mounted on a control valve lever 98.

The operative connection between shaft 86 and control valve member 60 includes control valve lever 98, which operatively engages control shaft 86 at adjustment screw 96, and a conventional overcenter snap-action means 100 which is operatively connected between control valve lever 98 and control valve member 60. At one end, control valve lever 98 is mounted on a pivot pin 102 which is secured to valve body 12. Control valve lever 98 pivots about pin 102 and is biased into engagement with lower end 94 of control shaft 86 at adjustment screw 96 by means of a coil spring 104 mounted in compression between lower plate 16 and a retainer cup 106 mounted on control valve lever 98 at the free end thereof. It will thus be apparent that the control valve lever 98 will pivot about pivot pin 102 in response to axial movement of control shaft 86. An access plug 107 is threaded into lower plate 16 at a position whereby removal of access plug 107 permits access to adjusting screw 96 from the exterior of casing 10.

Overcenter snap-action mechanism 100 is retained within cup-shaped support member 66 by means of a retainer 108 and comprises the conventional thrust button 110, plunger 112, clicker 114, fulcrum button 116, and fulcrum levers 118. Thrust button 110 is mounted on retainer 108 for engagement with an abutment screw 120 threaded into control valve lever 98 at a point intermediate the ends thereof and transmits the motion of control valve lever 98 to plunger 112. An access plug 121 is threaded into lower plate 16 at a position whereby the removal of access plug 121 permits rotation of abutment screw 120 from the exterior of casing 10.

As is well known, plunger 112 actuates clicker 114 between an inactive and an active position through an overcenter position with a snap action in response to an applied force on thrust button 110 to thereby transmit an amplified movement to fulcrum levers 118. Since fulcrum levers 118 are adapted to engage valve stem 61 at the bottom end 122 thereof, movement of clicker 114 through the operating positions thereof causes axial movement of valve stem 61.

When clicker 114 is in the inactive position thereof, fulcrum levers 118 allow spring 62 to maintain control valve member 60 in engagement with valve seat 58. This condition exists during the movement of clicker 114 from the relaxed position thereof through its preliminary graduating movement to the overcenter position. However, when the clicker snaps overcenter, fulcrum levers 118 force valve stem 61 upwardly thereby moving control valve member 60 to an open position. This condition exists until clicker 114 is moved to the return overcenter position at which time fulcrum levers 118 will allow spring 62 to move control valve member 60 into engagement with valve seat 58. It will be apparent that control valve member 60 is operable to move abruptly between alternate open and closed positions in response to the operation of the overcenter snap-action mechanism 100.

The operative connection between control shaft 86 and throttle valve member 72 comprises a throttle valve lever 124 mounted at one end on a pivot pin 126 which is secured to valve body 12. Throttle valve lever 124 pivots about pin 126 and has a slot 128 and an abutment flange 130 intermediate the ends thereof. Abutment flange 130 extends from the underside of throttle valve lever 124 which is positioned so that stem 52 extends through slot 128 and abutment flange 130 is engageable with a flange 132 on control shaft 86. A coil spring 134 positioned in compression between upper plate 14 and the upper side of throttle valve lever 124 biases abutment flange 130 into engagement with flange 132 whereby throttle valve lever 124 is movable in response to movement of control shaft 86.

Coil spring 78 biases throttle valve stem 74 into engagement with the underside of throttle valve lever 124 at a point adjacent the freely movable end thereof. Since flange 132 engages abutment flange 130 at a point adjacent the pivoted end of throttle valve lever 124, the axial movement of control shaft 86 will be transmitted into a corresponding amplifying movement of throttle valve member 72. It will be apparent that throttle valve member 72 is movable in response to control shaft movement from a closed position in engagement with valve seat 70 through a plurality of open positions in which valve member 72 is spaced from valve seat 70 by varying amounts to thereby regulate the flow of fluid through passageway 68.

In the operation of the embodiment shown in FIGS. 1 and 2, the temperature adjusting dial 34 is rotated to a desired temperature setting. When the control valve member 60 is in the fully closed position as shown in FIG. 2, bellows 48 has expanded to move control shaft 86 downwardly to a position whereby throttle valve lever 124 has been actuated to move throttle valve member 72 into engagement with valve seat 70 and control valve lever 98 has been actuated to move snap-action mechanism 100 to the inactive position thereof in which spring 62 biases control valve member 60 into engagement with control valve seat 58. As the bulb temperature falls, bellows 48 contracts allowing control shaft 86 to be moved upwardly under the bias of spring 104 acting through control valve lever 98 and adjustment screw 96. The upward movement of control shaft 86 is transmitted to throttle valve member 72 by throttle valve lever 124 and to thrust button 110 by control valve lever 98.

It will be apparent that while this upward movement of control shaft 86 will cause a gradual opening movement of throttle valve member 72, control valve member 60 will remain in the closed position thereof until the snap-action mechanism 100 has been moved through the preliminary graduating movement thereof to snap overcenter at which time fulcrum levers 118 actuate control valve member 60 to the open position thereof. This action places the control valve member 60 in the initial open position in which the flow of fluid passes from inlet chamber 28 through passageway 56 into control chamber 31 from which the fluid flow passes through passageways 68 and 80 into outlet chamber 30.

The point at which snap-action mechanism 100 snaps overcenter to move control valve member 60 to the open position thereof may be adjusted by rotation of adjustment screw 96. The initial open position of throttle valve member 72 is adjustable by rotation of adjustment screw 96 to set the desired amount of initial flow through throttle valve seat 70. Initial flow of 50 percent of capacity is considered to be a desirable condition. After the control valve member 60 is actuated into the initial open position, further contraction of bellows 48 would cause additional upward movement of control shaft 86 which causes further upward movement of throttle valve member 72 until the fully open position of the control valve member 60 is reached.

Upon subsequent expansion of bellows 48 in response to an increase in bulb temperature, the control valve member 60 will throttle down from the fully open position as control shaft 86 is moved downwardly by stem 52. This results in a corresponding downward movement of throttle valve lever 124 under the bias of spring 134 to cause throttle valve member 72 to cover passageway 68.

Throttle valve member 72 will gradually move to the closed position thereof as snap-action mechanism 100 is moved through its return preliminary graduating movement so that throttle valve member 72 will cover passageway 68 before the snap-action mechanism snaps overcenter. With the throttle valve member 72 covering passageway 68 and the control valve member 60 in the open position thereof, the control valve is in a minimum flow position in which a flow of fluid passes from inlet chamber 28 through passageway 56 into central chamber 31 from which the fluid flows through passageway 80 into outlet chamber 30. This greatly reduced flow slows the room temperature rise and prolongs the "burner on" time thereby effecting a longer period of thermal convection which minimizes stratification of the air in the space to be heated. Further downward movement of control shaft 86 at this point will cause snap-action mechanism 100 to snap overcenter to its inactive position thereby allowing control valve member 60 to cover passageway 56 placing the control valve in the fully closed position.

Figure 3:
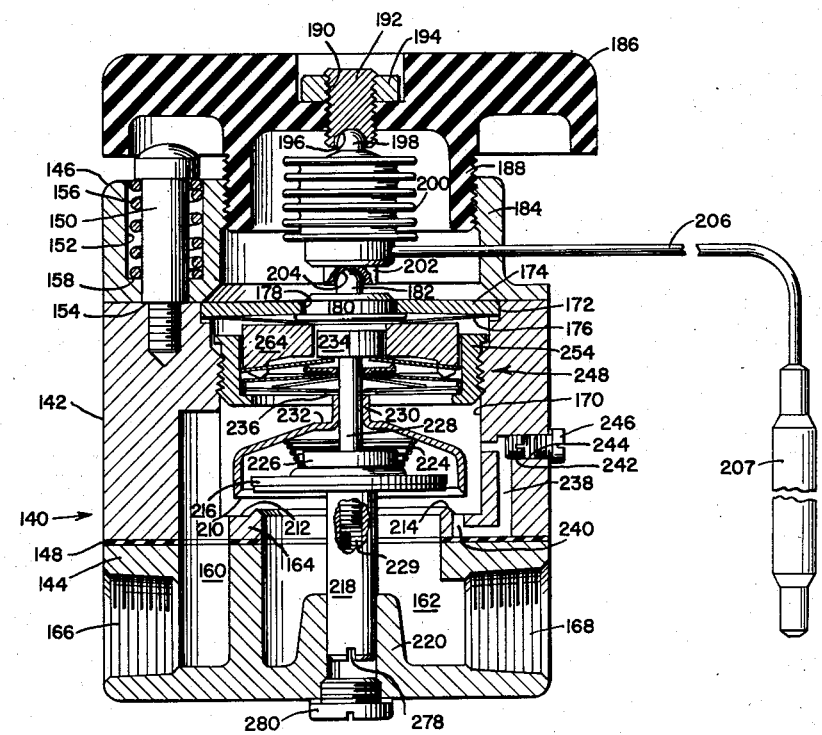
FIG. 3 is a cross-sectional view of a second embodiment of the invention.
Figure 4:
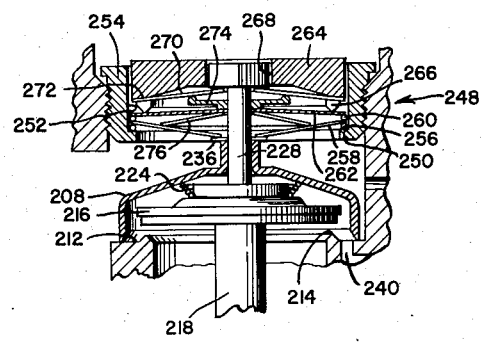
FIG. 4 is a fragmentary view of a detail of FIG. 3.

Referring now to FIGS. 3 and 4, the coaxial snap-throttle control valve illustrated therein includes a casing 140 comprised of a main valve body 142, a lower valve body 144, and an upper housing 146. Lower valve body 144 is fastened to main valve body 142 by means of bolts (not shown), or other suitable means, with a gasket 148 positioned between the cooperating faces thereof. Upper housing 146 is mounted on main valve body 142 by means of four bolts 150 (only one being shown in FIG. 3). Each bolt 150 is positioned within a recess 152 in upper housing 146 to extend through a bore 154 for threaded engagement with main valve body 142. Each of the bolts 150 has a spring 156 positioned in compression between its bolt head and a shoulder 158 formed on upper housing 146 within recess 152 whereby upper housing 146 is biased into engagement with main valve body 142.

Upper valve body 142 and lower body 144 cooperate to define an inlet chamber 160 and an outlet chamber 162 with an intermediate wall member 164 therebetween. Lower valve body 144 defines an inlet 166 communicating with inlet chamber 160 and an outlet 168 communicating with outlet chamber 162. Upper valve body 142 has a bore 170 therein communicating with inlet chamber 160. Bore 170 is counterbored at the exterior end 172 thereof for reception of a disc-plug 174 and a diaphragm 176 which seals bore 170. Disc-plug 174 has a central opening 178 for reception of a thrust button 180 engaging diaphragm 176 and having a centrally located plug member 182 formed to extend upwardly from its outer side.

Upper housing 146 has an internally threaded cylindrical projection 184 extending in axial alignment with bore 170 in upper valve body 142. A temperature dial 186 is mounted on upper housing 146 by means of a cylindrical projection 188 thereon threadedly inserted within cylindrical projection 184. Temperature dial 186 has a threaded bore 190 therein in axial alignment with bore 170. A temperature adjusting plug 192 is threaded into bore 190 and has a lock washer 194 secured thereto for locking plug 192 against rotation. Plug 192 has a centrally located recess 196 therein for reception of the top end 198 of an expansible and contractable bellows 200 vertically supported at its bottom end 202 on plug member 182 which is inserted within a recess 204 in bottom end 202.

Bellows 200 contains a suitable thermally responsive fluid and connects, through a capillary tube 206 with a temperature sensing bulb 207 positioned in the space where the temperature is to be controlled. Since top end 198 of bellows 200 is confined against movement by plug 192, bottom end 202 is movable in accordance with the bellows expansion and contraction in response to bulb temperature variations to thereby cause vertical movement of thrust button 180. It will be apparent that thrust button 180 is also vertically movable upon rotation of either temperature dial 186 or temperature adjusting plug 192, the rotation of which causes vertical movement of bellows 200.

A generally cup-shaped throttle valve member 208 is mounted in an inverted position for vertical movement in the inlet chamber 160 so that its peripheral edge 210 is movable into and out of engagement with an oppositely disposed face 212 on intermediate wall member 164. Throttle valve member 208 cooperates with face 212 to define a main passageway between inlet chamber 160 and outlet chamber 162. A circular control valve seat 214 forms the inner edge of face 212 to thereby intersect the main passageway. Control valve seat 214 has a smaller diameter than peripheral edge 210 of throttle valve member 208 and is formed in axial alignment with bore 170 and in concentric relation to the circular line of engagement between peripheral edge 210 and face 212.

An annular control valve member 216 is secured to a valve stem 218 which is mounted for axial movement in a valve guide 220 formed on lower valve body 144 in axial alignment with bore 170. The underside of control valve member 216 is movable into and out of engagement with valve seat 214. Cup-shaped throttle valve member 208 is adapted to enclose control valve member 216 as it cooperates with control valve seat 214. A coil spring 224 mounted in compression between the upper side of control valve member 216 and throttle valve member 208 is operative to bias the former toward control valve seat 214 and the latter away from its seat on face 212. Coil spring 224 is held in place by a spring retaining cup 226 mounted on the upper side of control valve member 216.

An upper shaft portion 228 is threaded into a bore 229 in the end of valve stem 218 to extend upwardly from control valve member 216 into bore 170. Throttle valve member 208 is mounted for slidable movement on shaft portion 228 by means of a sleeve 230 extending outwardly from the base 232 of throttle valve member 208. For purposes to be hereinafter described, the upper end of shaft portion 228 is formed with a square shoulder member 234 and a washer 236 is mounted on shaft portion 228 to rest on the upper end of sleeve 230.

In order to allow a flow of fluid from inlet chamber 160 through outlet chamber 162 when throttle valve member 208 engages its seat on face 212, an auxiliary passageway is provided. The auxiliary passageway is comprised of the passageway defined by control valve seat 214 and by a bypass passageway 238 communicating at one end with inlet chamber 160 and at the other end with one passageway of an L-shaped duct 240 formed in intermediate wall member 164. The other leg of L-shaped duct 240 communicates with face 212 outwardly of control valve seat 214 and inwardly of the circular line where throttle valve member 208 engages face 212. It will thus be apparent that control valve seat 214 intersects both the main and auxiliary passageways between inlet chamber 160 and outlet chamber 162. The flow area of bypass passageway 238 is adjustable by means of an adjustable plug valve member 242 threadedly mounted in a bore 244 in valve body 142 to project into bypass passageway 238. Bore 244 extends to the exterior of valve body 142 and is sealed by means of an access and sealing plug 246 which is removable when adjustment of valve member 242 is desired.

A control means is provided for transmitting the movement of bellows 200 to control valve member 216 and throttle valve member 208 whereby the fluid is controlled. Such means takes the form of a snap-action and lever mechanism 248 mounted on a shoulder 250 formed by an annular recess 252 on the inner periphery of a cylindrical support member 254 threaded at its outer periphery into bore 170. As is best shown in FIG. 4, snapacting and lever mechanism 248 includes a bearing ring 256 resting on shoulder 250 and a pair of throttle levers 258 supported by ring 256 and washer 236. A second bearing ring 260, which is the same size as bearing ring 256, is positioned to rest on throttle levers 258 and has a conventional clicker disc 262 supported thereon.

A clicker plunger 264 slidable within annular recess 252 is adapted to be supported by clicker disc 262 at an annular knife-edge projection 266. Plunger 264 has a square central opening 268 for reception of square shoulder member 234 which is slidable therein. A pair of fulcrum levers 270 are staked into plunger 264 at recesses 272 and engage the underside of shoulder member 234 to thereby provide support for valve stem 218.

Snap-acting and lever mechanism 248 also includes a conventional fulcrum button 274 positioned between fulcrum levers 270 and clicker 262 and a disc lever 276 positioned between clicker 262 and throttle levers 258. Fulcrum button 274, clicker 262, and disc lever 276 are positioned on shaft portion 228 by means of central openings therein. Plunger 264 is so positioned that thrust button 180 rests thereon with diaphragm 176 therebetween. It will thus be apparent that vertical movement of bellows 200 will be transmitted to plunger 264 through thrust button 180.

Vertical movement of plunger 264 actuates clicker 262 between an inactive and an active position through an overcenter position with a snap action. While moving through these positions, clicker 262 is operative to transmit movements to fulcrum levers 270 through fulcrum button 274. Since fulcrum levers 270 engage valve stem 218 at the underside of square shoulder member 234 and valve stem 218 is biased downwardly by spring 224 acting on control valve member 216, upward movement of fulcrum button 274 in response to clicker movement will cause a corresponding movement of fulcrum levers 270 and of valve stem 218, which is guided in valve guide 220 and square central opening 268. When clicker 262 is in the inactive or relaxed position thereof, fulcrum levers 270 are positioned to maintain valve stem 218 in a raised position so that spring 224 is unable to urge valve member 216 into engagement with control valve seat 214. This condition exists during movement of clicker 262 from its relaxed position through the preliminary graduating movement thereof to the overcenter position. However, when clicker 262 snaps overcenter to its active position, fulcrum levers 270 move downwardly to allow spring 224 to move control valve member 216 downwardly into engagement with control valve seat 214.

This condition exists until clicker 262 is moved through the return overcenter position thereof at which time fulcrum levers 270 will raise valve stem 218 so that spring 224 is no longer able to force control valve member 216 into engagement with control valve seat 214. It will thus be apparent that control valve member 216 is operable to move abruptly between alternate open and closed positions in response to clicker snap-action operation.

As clicker 262 is actuated through the operating positions thereof to control movement of control valve member 216, it is also operative to control movement of throttle valve member 208. Movement of clicker 262 in response to actuation by plunger 264 in one sense causes a corresponding movement of disc lever 276 in the same sense. Since disc lever 276 engages each throttle lever 258 at a point adjacent the ends supported on bearing ring 260, movement of disc lever 276 in one sense will be transmitted into corresponding amplified movement in the same sense of the ends of throttle levers 258 supported by washer 236. Throttle valve member 208, which engages washer 236 under the bias of spring 224, is movable in response to throttle lever movement from the closed position in which throttle valve member 208 seats on face 212 and a plurality of open positions in which throttle valve member 208 is out of engagement therewith to thereby regulate the main passageway flow.

In the operation of the embodiment shown in FIGS. 3 and 4, temperature adjusting plug 192 is positioned to a desired temperature setting by rotation of dial 186. When the control valve is in the fully closed position, bellows 200 has expanded to move plunger 264 downwardly to a position whereby clicker 262 is in its active position. In this condition, throttle levers 258 are positioned to maintain throttle valve member 208 in engagement with face 212 against the bias of spring 224 and fulcrum levers 270 are positioned to allow spring 224 to maintain control valve member 216 in engagement with control valve seat 214. As the bulb temperature falls, bellows 200 contracts allowing plunger 264 to be moved upwardly by the force of clicker 262 seeking to return to its relaxed state. This movement of plunger 264 and clicker 262 will allow upward movement of the ends of throttle levers 258 supported on washer 236 whereby throttle valve member 208 is moved out of engagement with its seat on face 212 by the action of spring 224.

While plunger 264 is moved upwardly and clicker 262 is moved through the preliminary graduating movement from its active position to cause a gradual opening movement of throttle valve member 208, control valve member 216 will remain in the closed position thereof since the length of the upper shaft portion 228 is such that fulcrum levers 270 will not exert sufficient lifting force on shoulder member 234 to overcome the downward bias of spring 224 on control valve member 216. When clicker 262 snaps overcenter, fulcrum levers 270 are urged upwardly by fulcrum button 274 to exert a lifting force on shoulder member 234 to overcome the downward bias of spring 224 on control valve member 216 and cause an abrupt opening movement of control valve member 216. This action places the control valve in the initial open position thereof in which the flow of fluid passes through both the main and auxiliary passageways.

A desired initial control valve open position in which throttle valve member 208 is opened approximately 50 percent of capacity when control valve member 216 snaps to the open position thereof may be obtained by proper lever and spring arrangement. Raising or lowering of shoulder member 234 in relation to control valve member 216 provides an adjustment means to prevent opening of the control valve member 216 before clicker 262 snaps overcenter from the active position to the inactive position. This adjustment is accomplished by rotation of valve stem 218 by means of a screw slot 278 in the lower end thereof. Screw slot 278 is accessible upon removal of an access and sealing plug 280 threaded into lower valve body 144 adjacent screw slot 278. Shaft portion 228 is not rotatable because it is keyed to plunger 264 which is not easily rotatable because of the loads thereon. It will thus be apparent that rotation of stem 218 causes axial movement of shaft portion 228 by virtue of the threaded engagement therebetween.

After the control valve has been actuated to the initial open position, further contraction of bellows 200 allows additional upward movement of plunger 264 under the action of clicker 262 seeking to return to its relaxed position. This movement allows upward movement of throttle levers 258 and throttle valve member 208 under the bias of spring 224 until a fully open position of the control valve is reached.

Upon subsequent expansion of bellows 200 in response to an increase in bulb temperature, the control valve will throttle down from the fully open position as plunger 264 is forced downwardly by thrust button 180. This results in a preliminary graduating movement of clicker 262 during which time disc lever 276 causes an amplified downward movement of throttle levers 258 whereby throttle valve member 208 is moved toward its seat on face 212. Throttle valve member 208 will gradually move to the closed position thereof before clicker 262 reaches the overcenter position whereby the main passageway flow is shut off. This places the control valve in a minimum flow position as is shown in FIG. 4. In this position the flow of fluid through the auxiliary passageway is as follows: from inlet chamber 160 through bypass passageway 238, duct 240, and the control valve seat 214 into outlet chamber 162.

Although the closing pressure of spring 224 against control valve member 216 is increased as throttle valve member 208 is moved to its closed position, it is not sufficient to cause downward movement of control valve member 216 against the upward force of fulcrum levers 270. Further downward movement of plunger 264 at this point will cause clicker 262 to snap overcenter thereby allowing control valve member 216 to be moved into engagement with control valve seat 214 placing the control valve in the fully closed position. Bolts 150 and springs 156 serve as an override for excessive bellows expansion by allowing upper housing 146 to be lifted when excess temperature conditions are encountered.

It is to be understood that although several embodiments of this invention have been shown and described, the invention can be variously embodied and changes may be made in the construction and arrangement of parts without departing from the scope of the invention as defined by the appended claims.

I claim:

1. In a fluid flow control device, the combination comprising a casing having an inlet, an outlet, and an intermediate wall member therebetween, means defining a first passageway through said intermediate wall member, means defining a second passageway through said intermediate wall member communicating with said first passageway through a central chamber formed by said intermediate wall member, a valve seat formed on said intermediate wall member interposed between said inlet and said first passageway, a first valve member movable between open and closed positions relative to said seat for controlling the flow of fluid through said first and second passageways, a second valve member cooperable with a wall of said second passageway for regulating the flow of fluid therethrough, said second valve member being movable between a closed position preventing fluid flow through said second passageway and a plurality of open positions permitting fluid flow through said second passageway, a control means movable in response to variations in a controlling condition, a first operative connection between said control means and said second valve member for moving the same from one of said open positions to said closed position in response to a first movement of said control means in one direction, a second operative connection to said control means adapted for actuating said first valve member, and an overcenter snap action means operatively connected between said second operative connection and said first valve member for abruptly moving the same between said open and said closed positions thereof in response to further movement of said control means, and said first operative connection between said control means and said second valve member being responsive to a movement of said control means in a reverse direction to open said second valve member to an adjustably predetermined open position whereupon said second operative connection actuates said over center snap action means to return said first valve member to its open position and means for adjusting said predetermined open position of said second valve member with respect to the position of said control means at which said control means operates to actuate said snap action means to reopen said first valve member.

2. In a fluid flow control device, the combination comprising an inlet, an outlet, and an intermediate wall member therebetween, means defining a first passageway through said intermediate wall member, means defining a second passageway through said intermediate wall member communicating with said first passageway through a central chamber formed by said intermediate wall member, a valve seat formed on said intermediate wall member interposed between said inlet and said first passageway, a first valve member movable between open and closed positions relative to said seat for controlling the flow of fluid through said first and second passageways, a second valve member cooperable with a wall of said second passageway for regulating the flow of fluid through said second passageway, said second valve member being movable between a closed position preventing fluid flow through said second passageway and a plurality of open positions permitting fluid flow through said second passageway, a control means movable in response to variations in a controlling condition, a first operative connection between said control means and said second valve member for moving said second valve member between said positions thereof in response to said movement of said control means in one direction, a second operative connection to said control means adapted for actuating said first valve member, and an overcenter snap-action means operatively connected between said second operative connection and said first valve member for abruptly moving said first valve member from one of said open positions to said closed positions in response to further movement of said control means in said one direction, and said first operative connection between said control means and said second valve member being responsive to a movement of said control means in a reverse direction to open said second valve member to an adjustably predetermined open position whereupon said second operative connection actuates said over-center snap action means to return said first valve member to its open position, and means for adjusting said predetermined open position of said second valve member with respect to the position of said control means at which said control means operates to actuate said snap-action means to reopen said first valve member.

3. In a fluid flow control device, the combination comprising a casing having an inlet, an outlet, and an intermediate wall member therebetween, means defining a first passageway through said intermediate wall member, means defining a second passageway through said intermediate wall member communicating with said first passageway through a central chamber formed by said intermediate wall member, a first valve seat formed on said intermediate wall member interposed between said inlet and said first passageway, a second valve seat formed on said intermediate wall member adjacent to said second passageway, a first valve member movable between open and closed positions relative to said first valve seat for controlling the flow of fluid through said first and second passageways, a second valve member for regulating the flow of fluid through said second passageway, said second valve member being movable between a closed position in which said second valve member covers said second valve seat and a plurality of open positions in which said second valve seat is uncovered, a first lever means operatively connected to said second valve member for moving the same between said positions thereof, a second lever means adapted to actuate said first valve member, overcenter snap-action means operatively connected between said second lever means and said first valve member for moving the same abruptly between said alternative positions thereof while passing through said overcenter positions thereof, condition responsive means movable in response to variations in a condition, said condition responsive means being operatively connected to said first and second lever means for simultaneously actuating said first lever means to move said second valve member from one of said open positions thereof to said closed position thereof and said second lever means to move said snap-action means through a preliminary graduating movement thereof while maintaining said first valve member in said open position thereof when said condition responsive means operates in one direction, and thereafter to actuate said snap action means to close said first valve member when said condition responsive means is further moved in said one direction, and to simultaneously actuate said first lever means to move said second valve member from said closed position adjustably to one of the open positions thereof and said second lever means to move said snap-action means through a preliminary graduating movement thereof while maintaining said first valve member in said closed position thereof when said condition responsive means operates in the other direction, and thereafter to actuate said snap-action means to open said first valve member when said condition responsive means is further moved in said other direction, and means for adjusting said open position of said condition responsive means at which said condition responsive means operates to actuate said snap-action means to re-open said first valve member.

4. In a fluid flow control device, the combination comprising a casing having an inlet, an outlet, and an intermediate wall member therebetween, means defining a minimum flow passageway through said intermediate wall member, means defining a maximum flow passageway through said intermediate wall member communicating with said minimum flow passageway, a valve seat formed on said intermediate wall member interposed between said outlet and said maximum flow passageway, a first valve member for controlling the flow of fluid through said minimum and maximum flow passageways, said first valve member being movable between a closed position in which said valve member covers said valve seat and an open position in which said valve seat is uncovered, a second valve member cooperable with a wall of said maximum flow passageway for regulating the flow of fluid through said maximum flow passageway, said second valve member being movable between a closed position preventing fluid flow through said maximum flow passageway and a plurality of open positions permitting fluid flow through said maximum flow passageway, a control means movable in response to variations in a controlling condition, a first operative connection between said control means and said second valve member for moving said second valve member from one of said open positions to said closed position in response to a preliminary movement of said control means in one direction, a second operative connection to said control means adapted for actuating said first valve member, and an overcenter snap-action means operatively connected between said second operative connection and said first valve member for abruptly moving said first valve member between said positions thereof in response to further movement of said control means, said snap-action means being responsive to said preliminary movement of said control means in one direction to move through a preliminary graduating movement while maintaining said first valve member in said open position until a flow of fluid through the device is restricted to said minimum flow passageway, and responsive thereafter to further movement of said control means in said direction to close said first valve member, and further responsive to a preliminary reverse movement of said control means in the other direction to move through a preliminary graduating movement while maintaining said first valve member in said closed position as said control means is actuating said first operative connection to open said second valve means adjustably to one of said open positions thereof, and thereafter responsive to further movement of said control means in said direction to restore said first valve into said open position, and means for adjusting said open position of said second valve member with respect to the position at which said control means operates to actuate said snap action means to re-open said first valve member.

5. A device as claimed in claim 4 wherein said first operative connection between said control means and said second valve member includes a lever means for transmitting the movement of said control means into a corresponding amplified movement of said second valve member.

6. A device as claimed in claim 5 wherein said minimum flow passageway includes a bypass portion communicating with said valve seat and including means for adjusting the flow control area of said bypass portion.

7. In a fluid flow control device, the combination comprising a casing including an intermediate wall member defining an inlet chamber, an outlet chamber, and a central chamber between said inlet and outlet chambers, a main passageway between said inlet chamber and said central chamber, a main valve member cooperable with a wall of said main passageway and movable between an open and a closed position for controlling the flow of fluid between said inlet chamber and said central chamber, an outlet passageway between said central chamber and said outlet chamber, an outlet valve member cooperable with a wall of said outlet passageway for regulating the flow of fluid through said outlet passageway, said outlet valve member being movable between a closed position in which said outlet valve member covers said outlet passageway and a plurality of open positions in which said outlet passageway is uncovered, a control means movable in response to variations in a controlling condition, a first operative connection between said control means and said outlet valve member for moving the same from one of said open positions thereof to said closed position thereof in response to a preliminary movement of said control means in one direction, a second operative connection to said control means adapted for actuating said first valve member, and an overcenter snap-action means operatively connected between said second operative connection and said main valve member for abruptly moving said main valve member between said controlling positions thereof in response to movement of said control means, said snap-action means being responsive to said preliminary movement of said control means in said one direction to move through a preliminary graduating movement while maintaining said main valve member in said open position thereof until said outlet valve is closed, and thereafter responsive to further movement of said control means to close said main valve member, and further responsive to a preliminary reverse movement of said control means in the other direction to move through a preliminary graduating movement while maintaining said main valve member in said closed position as said control means is actuating said first operative connection to move said outlet valve member adjustably to one of said open positions thereof, and thereafter responsive to further movement of said control means in said other direction to restore said main valve into its said open position and means for adjusting said open position of said outlet valve member with respect to the position of said control means at which said control means operates to actuate said snap action means to re-open said main valve member.

8. In a fluid flow control device, the combination comprising a casing having an inlet, an outlet and an intermediate wall member therebetween, means defining a main passageway through said intermediate wall member, main valve means for regulating the flow of fluid through said main passageway, said main valve means including a main valve member cooperable with a wall of said main passageway to move between a closed position preventing fluid flow through said main passageway and a plurality of open positions permititng fluid flow through said main passageway, a valve seat formed on said intermediate wall member located in said main passageway downstream of said main valve means, means defining an auxiliary passageway through said intermediate wall member including a bypass passageway in said intermediate wall member communicating at one end with said inlet and at the other end with said main passageway at a point intermediate said main valve means and said valve seat, a second valve member for controlling the flow of fluid through said main and auxiliary passageways, said second valve member being movable between a closed position in which said second valve member covers said valve seat and an open position in which said valve seat is uncovered, a control means movable in response to variations in a controlling condition, an operative connection between said control means and said main valve member for moving the same from one of said open positions thereof to said closed position thereof in response to a first movement of said control means, said operative connection including an overcenter snap-action means, and an operative connection between said control means and said second valve member including said overcenter snap-action means for abruptly moving said second valve member between said controlling positions thereof in response to movement of said control means, said operative connection between said control means and said second valve member being responsive to said first movement of said control means to move said snap-action means through a preliminary graduating movement while maintaining said second valve member in said open position thereof.

9. A device as claimed in claim 8 wherein said control means includes a plunger member mounted for slidable movement in response to variations in said controlling condition, said plunger member including an abutment means engaging snap-action means.

10. A device as claimed in claim 9 including resilient means for biasing said second valve member toward said valve seat and a valve stem secured to said second valve member and wherein said operative connection between said control means and said second valve member includes a fulcrum lever means engaged between said valve stem and said snap-action means for moving said second valve member against the bias of said resilient means.

11. A device as claimed in claim 10 wherein said plunger member defines a bore therein, said valve stem being positioned for slidable movement within said bore and said main valve member being mounted for slidable movement on said stem.

12. A device as claimed in claim 11 wherein said resilient means is positioned to bias said main valve member toward said open positions thereof and said operative connection between said control means and said main valve member includes an amplifying lever means positioned between said snap-action means and said main valve member for moving said main valve member against the bias of said resilient means.

13. In a fluid flow control device, the combination comprising a casing having an inlet, an outlet, and an intermediate wall member therebetween, a main passageway formed in said intermediate wall member communicating said inlet with said outlet, a main valve seat formed on the inlet side of said intermediate wall member and spaced adjacent said main passageway, a cup-shaped main valve member having its open end cooperable with a portion of said intermediate wall member disposed outwardly of said main valve seat, said main valve member being movable between a closed position to prevent fluid flow from said inlet to said main passageway and a plurality of open positions permitting fluid flow through said main passageway, an auxiliary passageway disposed in said intermediate wall member and having a first port in communication with said inlet, said auxiliary passageway having a second port spaced closely adjacent said valve seat and intermediate the second port and that portion of said intermediate wall member cooperable with said main valve member, a second valve member cooperable with said main valve seat and being movable between a closed position and an open position for regulating the flow of fluid through said main passageway, a condition responsive means variably movable in response to a controlled condition, a first operative connection between said condition responsvie means and said main valve member for variably positioning said main valve member relative to said valve seat in direct proportion to the movement of said condition responsive means, and a second operative connection including an overcenter snap action means disposed concentric to said first operative connection for abruptly moving said second valve member between controlling position thereof in response to movement of said condition responsive means whereby said snap action means is moved through a preliminary graduating movement while maintaining said second valve member in said open position thereof.

14. In a fluid control device, the combination comprising a casing including an intermediate wall member defining an inlet chamber, an outlet chamber, and a central chamber between said inlet and outlet chambers, a main passageway between said inlet chamber and said central chamber, a main valve member cooperable with the wall of said main passageway and movable between an open and a closed position for controlling the flow of fluid between said inlet chamber and said central chamber, an outlet passageway between said central chamber and said outlet chamber, an outlet valve member cooperable with a wall of said outlet passageway for regulating the flow of fluid through said outlet passageway, said outlet valve member being movable between a closed position in which said outlet valve member covers said outlet passageway and a plurality of open positions in which said outlet passageway is uncovered, a control means movable in response to variations in a controlling condition, a first operative connection between said control means and said outlet valve member for moving the same from one of said open positions thereof to said closed position thereof in response to a first movement of said control means, a second operative connection to said control means adapted for actuating said first valve member, and an over center snap-action means operatively connected between said second operative connection and said main valve member for abruptly moving said main valve member between said controlling positions thereof in response to movement of said control means, said snap-action means being responsive to said first movement of said control means to move through a preliminary graduating movement while maintaining said main valve member in said open position thereof, wherein said control means includes a shaft means movable axially in response to variations in said controlling condition, said first operative connection between said control means and said outlet valve member includes a pivotally mounted lever means biased into engagement with said shaft means and said outlet valve member, and said first operative connection between said control means and said snap-action means includes a pivotally mounted lever means biased into engagement with said shaft means.

15. A device as claimed in claim 14 including a bypass passageway between said central chamber and said outlet chamber whereby a flow of fluid can pass through said bypass passageway after said first movement of said control means.

References Cited in the file of this patent

UNITED STATES PATENTS

| | | |
|---|---|---|
| 2,702,052 | Grayson | Feb. 15, 1955 |
| 2,741,266 | Grayson | Apr. 10, 1956 |
| 2,783,946 | Lansky et al. | Mar. 5, 1957 |
| 2,814,447 | Greenamyer | Nov. 26, 1957 |
| 2,831,504 | Coffey | Apr. 22, 1958 |